Nov. 13, 1945.   H. K. EGLI   2,388,838
DIE
Filed Aug. 4, 1944   3 Sheets-Sheet 1

Inventor
Herman K Egli
by
Walter F Kaufman
Attorney

Nov. 13, 1945.  H. K. EGLI  2,388,838
DIE
Filed Aug. 4, 1944   3 Sheets-Sheet 2

Patented Nov. 13, 1945

2,388,838

UNITED STATES PATENT OFFICE 2,388,838

DIE

Herman K. Egli, Lancaster Township, Lancaster County, Pa., assignor to Armstrong Cork Company, Lancaster, Pa., a corporation of Pennsylvania Application August 4, 1944, Serial No. 548,087

14 Claims. (Cl. 164—29)

This invention relates to dies for shearing or shaping sheet materials and for shearing and shaping such materials as a single operation. The invention will find particular usefulness in the field of fabric shearing but will be useful also in the shearing and/or shaping of thin metals, foils, and plastics, such as thin transparent films like Cellophane.

One of the problems involved in the shearing of fabrics, such as cotton or silk, into shapes of more or less intricate outline is to maintain the sheet in a flat, plane condition during shearing. Where the shape or outline is complicated, the problem is magnified and with the thinner fabrics, particularly, much time is spent by the workmen in levelling out the material before actual cutting is effected. Attempts to overcome wrinkling often cause a non-uniform tensioning of the fabric which results in improperly shaped pieces when actually placed in use.

The principal object of my invention is to provide a die which will automatically place the sheet material being operated upon under tension prior to the severing or forming operations. Another object of my invention is to provide for automatic tensioning of the sheet materials along directions substantially in the plane of the sheet, with the tensioning substantially uniformly applied to the sheet throughout the extent thereof in that area which will be within the boundaries of the working portion of the die set effective for shearing or forming, or both.

According to my invention, the property of rubber and similar substantially incompressible materials to flow when placed under compression is availed of and utilized to tension the sheet material being operated upon. The tensioning elements are positioned to engage opposite faces of the sheet material to be fabricated and serve to clamp the fabric therebetween. Relative movement which is effected in bringing the die elements together to shear or shape the material is utilized to bring the tensioning elements under compression. Each tensioning element is confined except in a limited area and, as a consequence, the tensioning elements are caused to flow in a direction which will tension the fabric.

The mechanism consists of complementary die members with a pair of tensioning members formed of a flowable material, such as rubber, disposed in cooperative relationship to clamp a sheet of material therebetween, and means for confining the tensioning members against flow except in a limited direction, the tensioning members, when placed under compression with the sheet material therebetween, being thereby limited in flow to directions which place the fabric under tension.

My invention will be described in detail in conjunction with the attached drawings illustrating certain typical embodiments of my invention.

The arrangement shown in Figures 1 to 5 of the drawings is a shearing die for severing an annulus from a sheet of fabric, such as cotton aeroplane fabric or balloon cloth. A piece of this shape is used in the fabrication of access doors or openings in aircraft. Such an access door is provided to permit inspection and repair of rudder controls in the fabric-covered rudders of modern fighter planes, for example. The die set is relatively simple and has two circular shearing edges. It was chosen because of its simplicity and because it at the same time illustrates the principles involved in my invention. The shape of the die is not important. Even the most complex shapes may be embodied in the dies and satisfactory results will be obtained with my invention. The problem of tensioning is particularly acute, however, in dieing circular pieces from lightweight fabrics, for the material has a tendency to wrinkle and if tensioning is applied along the warp or the woof threads only, the died piece when cemented in place on the rudder will not be truly circular. Since the fabric is received within a metal frame for the door, it is important that it be circular and of proper shape in order to have a maximum fabric area in engagement with the metal parts in final assembly. My arrangement provides for tensioning in directions both along the warp and the woof threads, where this is necessary or desirable. In dies for cutting circular pieces, it is possible to uniformly tension the fabric in all directions radially from the center, thus assuring proper configuration of the piece when assembled.

Figure 1:
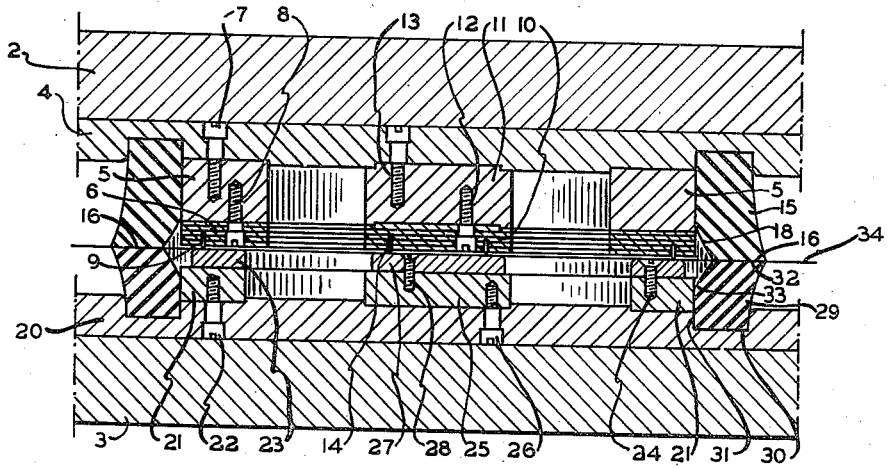
Figure 1 is a broken sectional view illustrating a circular shearing die of my invention mounted as a die set in a conventional press.

In Figure 1, bolster plates 2 and 3 are shown. These will be normally secured to the platens of the press in which the die elements are mounted.

This is conventional practice and needs no particular description. The guiding and limiting mechanism commonly employed in die sets has also been eliminated from Figure 1 since this, too, is conventional equipment and forms no part of the present invention.

The upper member or punch will be described first. It consists of a punch shoe 4 which is secured to the bolster plate 2 or directly to the press platen if a bolster plate is not used. A mounting ring 5 is provided and carries a wooden die mounting block 6. The mounting ring 5 is secured to the punch shoe 4 by hollow head machine screws 7 and the mounting block 6 is fastened to the ring 5 by similar screws 8. A circular cutting knife 9 is inlet into the mounting block 6 and firmly anchored thereto. The mounting block 6 may be formed of hard, laminated wood but may be made of metal or other material.

In the arrangement shown in Figure 1, there is a central cutting die which has been indicated by the numeral 10. The die 10 is secured to a mounting 11 by means of hollow head machine screws 12 and this mounting 11 is fastened to the punch shoe 4 by screws 13. The die 10 is similar to the outer cutting die and is preferably formed of hard, laminated wood into which is inletted an annular cutting knife 14, in accordance with usual rule die practice.

A tensioning ring 15 is mounted so as to surround the working area of the punch. This tensioning ring 15 is preferably formed of rubber and may be molded or cut to shape. With a 15" outer diameter, the ring 15 may be 3" deep and 1¼" thick. A rubber composition having a Shore Durometer hardness of 65 will operate satisfactorily with cotton fabric. The density of the rubber and the width and depth of the ring will be dependent upon the amount of tension desired, the material being operated upon, and other variable factors. The ring 15 is confined against radial flow in a direction toward the center of the die by the mounting ring 5 which serves as a confining ring. The tensioning ring 15 may be secured to the mounting ring 5 and to the punch shoe 4 by means of an adhesive or may be otherwise secured in place. It is preferably disposed in a recess as shown in Figure 1 since this makes positioning easy and aids in further confining the flow, concentrating it in the zone of the contacting surface 16 to enhance the tensioning effect.

By reference to Figure 2, it will be noted that the surface 16 of the tensioning ring 15 which engages the fabric 34 being operated upon normally lies in a plane below the plane of the cutting edge 17 of the knife 9. It also lies below the plane of the edge of the knife 14 which cuts the central opening. The knife 14 is shown in Figure 1 but not in Figure 2.

In order to assist in directing the flow of the tensioning ring in a radial direction away from the center of the die, the inner surface 18 of the tensioning ring 15 is preferably chamfered outwardly and downwardly so that upon compression of the ring 15, it will naturally tend to flow outwardly, particularly at the surface 16, due to the chamfering.

Considering now the lower element of the die set, it consists of a die shoe 20 which receives a mounting ring 21 similar to the mounting ring 5 in that it serves additionally as a confining member. The ring 21 is fastened to the die shoe 20 by means of hollow head machine screws 22 (Figure 1). An annular cutting block 23, which is preferably formed of hard, dense, fiber, is secured to the mounting ring 21 by means of screws 24. The fiber ring 23 serves to support the fabric at the line of shearing and also receives the shearing edge 17. The cutting block should be made of some material which is rigid enough to permit proper shearing, but at the same time, sufficiently elastic to avoid damage to the cutting edge.

A similar arrangement is provided for the center cutting die 10. A mounting block 25 is provided which is secured to the die shoe 20 by hollow head machine screws 26. A disc of fiber 27 forms the cutting block facing which takes the wear of the circular knife 14. This disc is secured in place on the mounting block 25 by means of screws 28.

A lower tensioning ring 29 is provided and is complementary to the tensioning ring 15 of the punch portion of the die assembly. The tensioning ring 29 is received in a recess 30 in the die shoe and may be secured thereto by means of adhesive. The tensioning ring 29 is confined against flow in a direction toward the center of the die by means of the mounting ring 21 and also by the wall 31 of the recess 30. The inner surface adjacent the fabric supporting surface 32 is chamfered upwardly and outwardly as indicated at 33 in Figure 1. This serves in the same manner as the chamfered portion 18 of the upper tensioning ring 15, directing flow of the rubber under compression in a radially outwardly direction. The lower tensioning ring 29 may be formed of a rubber composition the same as that of the ring 15 and it may have a depth of 2" and a width of 1¼" at the fabric engaging surface, corresponding generally to the upper tensioning ring 18. It will be noted by reference to Figure 2 that the plane of the work engaging surface 32 of the lower tensioning member 29 lies above the plane of the cutting block 23 when the dies are parted.

Figure 2:
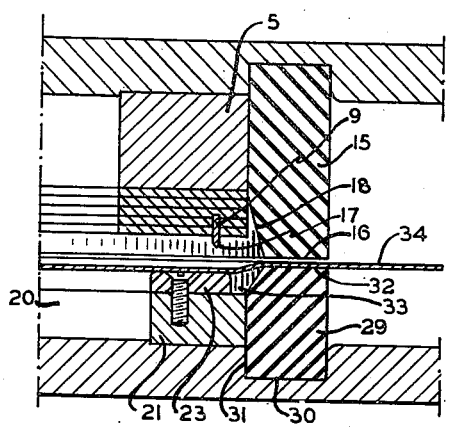
Figure 2 is a sectional view illustrating the tensioning arrangement in inoperative position with the punch and die members parted.
Figure 3:
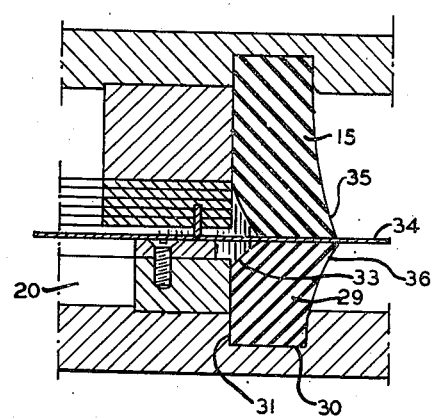
Figure 3 is a view similar to Figure 2 showing the tensioning arrangement in operative position upon completion of the dieing step.
Figure 4:
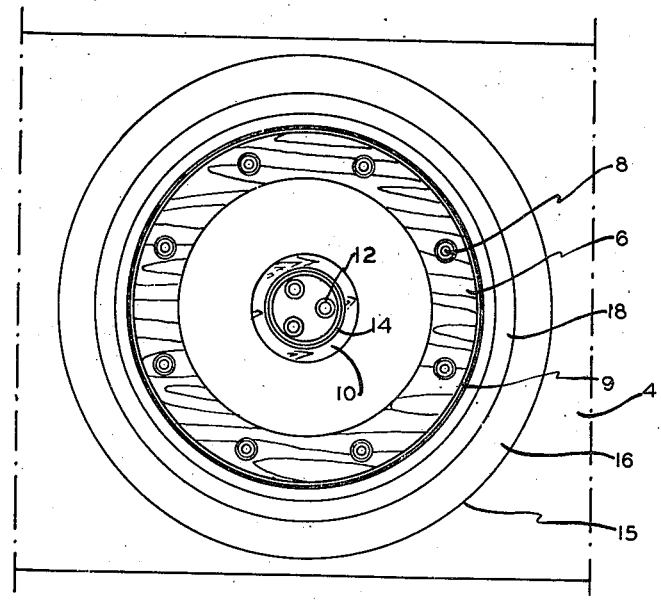
Figure 4 is a plan view of the punch member.
Figure 5:
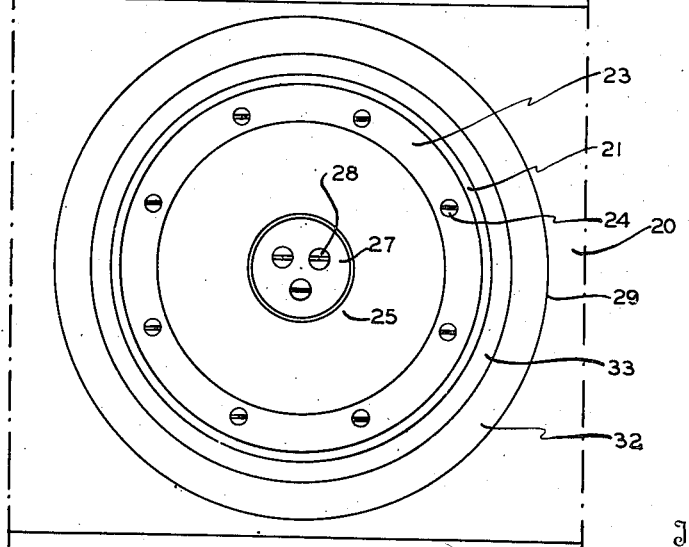
Figure 5 is a plan view of the die member.

In the operation of the die, a sheet of fabric 34 which is to be died out is positioned as indicated in Figure 2, resting upon the work engaging surface 32 of the tensioning ring 29, and upon the cutting block or ring 23. It also rests on the corresponding cutting block 27 for the center knife. Relative movement is effected between the press platens and this brings the surface 16 of the upper tensioning ring 15 into engagement with the upper surface of the fabric 34, thus causing the fabric to be clamped throughout the extent of the contacting surfaces 16 and 32 of the tensioning rings. Since the rings 15 and 29 surround the outer periphery of the working portion of the die, the fabric will be clamped circumferentially beyond the cutting edges 9 and 14. As relative movement of the punch and die elements continues, the tensioning members will flow due to the incompressible nature of the material from which they are formed and, since the members are confined by the supporting rings and the walls of the recesses in which they are received, such flow will be directed radially away from the center of the die. This will result in a uniform tensioning of the fabric. This is illustrated in Figure 3 where it will be observed that both the rings 15 and 29 have moved radially outwardly in the zones 35 and 36. Since the tensioning members are annular in shape, this will apply tension to the fabric throughout the circumference of the die. As downward movement continues, the knives 9 and 14 are thrust into the fabric 34 severing the same. A tensioning of the fabric 34 is effected prior to shearing and tension is maintained during the shearing operation. The tension is uniformly applied in all directions in the arrangement illustrated but may be varied to present differential tensioning as will be more fully explained.

Figure 6:
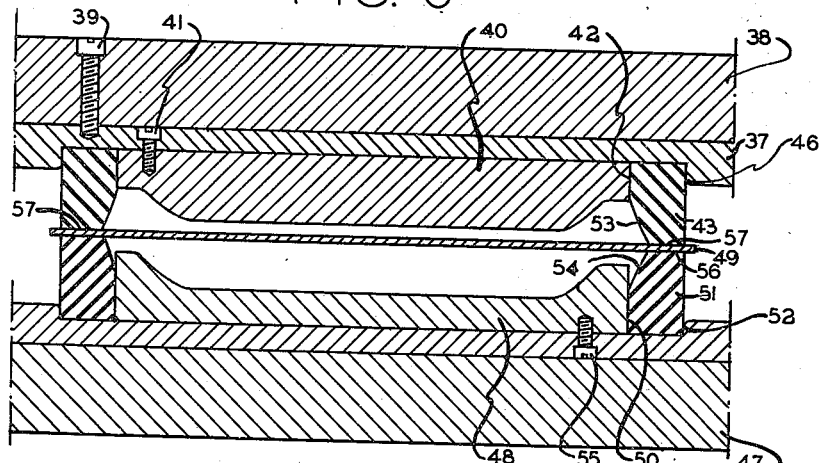
Figure 6 is a broken sectional view illustrating a rectangular forming die embodying my invention, with the die elements in engagement prior to commencement of forming.
Figure 7:
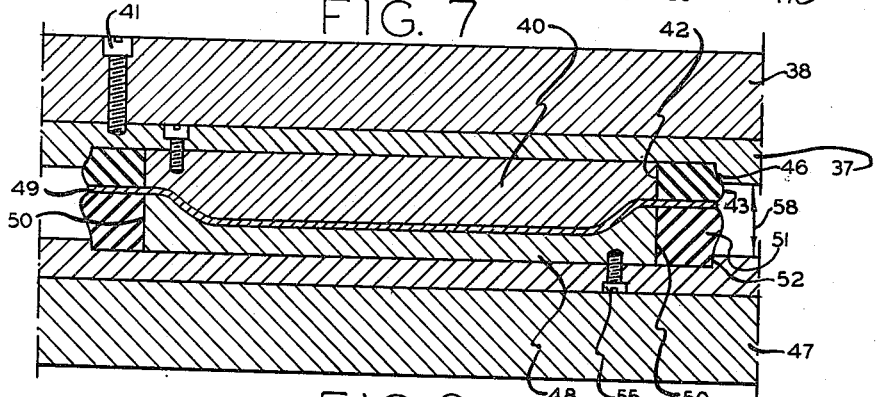
Figure 7 is a view similar to Figure 6 showing the parts at the completion of the forming operation.
Figure 8:
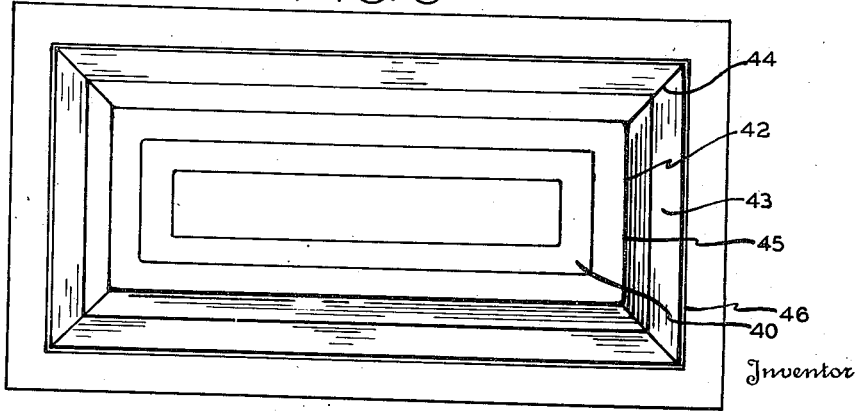
Figure 8 is an inverted plan view of the punch element of Figures 6 and 7.

In Figures 6, 7, and 8, there is shown a die for forming sheet material. The die may be constructed in a manner generally similar to the shearing die of Figures 1 to 5 insofar as the tensioning arrangement is concerned.

In the embodiment illustrated, there is an upper punch member and a lower cavity member which cooperate to form the sheet material pressed therebetween. The punch member or shoe 37 is secured to a bolster plate 38, similar to the bolster plate 2 of Figure 1, by machine screws 39 inlet into the bolster plate 38. A forming member 40 constitutes part of the punch and is secured to the punch shoe 37 by machine screws 41. In the embodiment illustrated, the forming member 40 is provided with a shoulder 42 which serves to confine an upper tensioning member 43. This shoulder 42 will preferably assume the contour of the periphery of the forming member 40 as indicated in Figure 8. The forming member 40 in the embodiment illustrated is adapted to shape a piece of generally rectangular configuration with rounded corners.

The tensioning member 43 may be formed as a strip and mitered as indicated at 44 in Figure 8 and positioned to surround the entire forming member 40, the material being cut or molded along the edge 45 to correspond to the outline of the shoulder 42.

The tensioning member 43 is confined within a recess which is defined by the shoulder 42 of the forming member 40 and a shoulder 46 formed on the punch shoe 37. In other words, the tensioning member 43 is received within a recess which is defined by the shoulders 42 and 46 and, when mitered into position, surrounds the entire periphery of the forming member 40. This is best illustrated in Figure 8.

The cavity plate or shoe 47 receives a forming member 48 which is complementary to the forming member 40 and between the two members, the material 49 is formed as shown in Figure 7. The cavity forming member 48 is provided with shoulder 50 which serves to confine a tensioning member 51 which is complementary to the tensioning member 43. The cavity plate 47 is provided with a corresponding shoulder 52 which also confines the tensioning member 51. The tensioning member 51 is preferably mitered into position in the same manner as the tensioning member 43. The tensioning members 43 and 51 are chamfered as indicated at 53 and 54 respectively so as to direct the flow of the tensioning members in a direction away from the center of the die. Preferably, the tensioning members are cemented in place with the adhesive also disposed in the mitered joint of each section. The cavity forming member 48 is secured to the cavity plate 47 by machine screws 55.

The forming die will operate in much the same manner as the shearing die of Figures 1 to 5 insofar as tensioning is concerned. However, in metal forming, it is generally necessary to apply more tension than in fabric shearing. Accordingly, the parts are so constructed and arranged as to effect this as shown in Figures 6 and 7.

In the operation of the forming die, the sheet of material 49 to be formed, such as a sheet of aluminum .025" thick, for example, is positioned over the cavity forming member 48, with the material 49 lying in engagement with the work engaging surface 56 of the lower tensioning member 51. Relative movement is effected between the press platens to which the punch and cavity members are secured and the work engaging surface 57 of the upper tensioning member 43 is brought into engagement with the surface of the material 49 opposite that engaged by the surface 56 of the lower tensioning member 51. This serves to clamp the material in place. As further relative movement is effected, the tensioning members 43 and 51 are placed under compression and since they are made of a substantially incompressible material, they flow. Being confined against flow by the surfaces 42 and 46, and 50 and 52, and being provided with chamfered surfaces 53 and 54, the flow is directed away from the center of the die and the sheet 49 being operated upon is placed in tension. As the forming of the metal is effected, the sheet 49 is firmly clamped and if the pressure necessary in forming is greater than the tensioning force of the members 43 and 51, they will be drawn inwardly toward the center of the die as shown in Figure 7. This will enhance the gripping action and will tend to create a greater tensioning force in an outward direction away from the die center. The position assumed by the tensioning members 43 and 51 at the completion of the forming operation is indicated in Figure 7. It will be noted that the shoulders 42 and 50 of the punch and cavity members together with the sheet 49 form a complete barrier against inward flow of the rubber. There is a limited flow in the chamfered areas 53 and 54 but once this area has been filled with the flowed rubber, all flow thereafter is limited to a zone 58 between the punch and cavity members. By extending the depth of the shoulders 46 and 52, an increase in tensioning may be obtained for the area in which flow may take place will be more limited. It is thus possible to vary the tensioning effect so as to apply greater or lesser tensioning and if desired the tension in one direction may be varied with respect to the tension in another direction.

From the foregoing, it will be clear that the particular shape or outline of the piece to be formed or sheared is not important for the arrangement of this invention will serve with dies of divers shape and contour.

If it is desired to tension the fabric or sheet material in one direction only, for example, in a direction parallel to the filler threads in shearing fabric, the complementary tensioning elements may be provided along only two edges of the die and may be disposed at right angles to the filler threads. As the die closes, and flow of the tensioning members is induced, tensioning in a single direction along the filler threads will result. Also, with certain dies, it may be desirable to provide for positive engagement at one or more edges of the fabric and effect tensioning by flow of an incompressible material in a direction away from the fixed edges.

The application of this invention to a combination forming and shearing die will be apparent from the foregoing description.

In fact, the invention may be embodied in any type of dies for working sheet material where there are a pair of die elements which are adapted to be moved relative to one another to work material therebetween and where tensioning of the sheet material being operated upon is desired. Such dies are generally referred to as die sets and generally include a punch member and a so-called die member (cavity member in forming and a cutting block or cut ring in shearing).

Many modifications may be made in the apparatus to meet the individual requirements in the forming and shearing or forming or shearing of the sheet material. For example, greater tensioning in certain areas may be effected by so shaping the tensioning elements that greater flow is induced in one area than in another, as well as by limiting the flow to different degrees in different areas as mentioned above. Other modifications will be evident when dealing with specific forming or shearing operations, when operating upon different materials, and when taking into consideration other variable factors.

While I have described and illustrated a preferred embodiment of my invention, it will be understood the same is not so limited but may be embodied within the scope of the following claims.

I claim:

1. A die set including punch and die members having cooperative portions for operating upon sheet material disposed therebetween and sheet tensioning means for clamping the sheet material to be operated upon and for applying tension thereto comprising a tensioning element associated with the punch member and formed of a substantially incompressible material capable of flowing under the application of pressure, a similar tensioning element associated with the die member and arranged to cooperate with the tensioning element associated with the punch member to clamp a sheet therebetween and confining means for the tensioning elements directing the flow thereof under applied pressure to tension the sheet which is clamped between the tensioning elements.

2. A die set including punch and die members having cooperative portions for operating upon sheet material disposed therebetween and sheet tensioning means for clamping the sheet material to be operated upon and for applying tension thereto comprising a tensioning element associated with the punch member and formed of a substantially incompressible material capable of flowing under the application of pressure, said element substantially circumscribing the working portion of the punch member, a similar tensioning element associated with the die member, substantially circumscribing the working portion thereof, and arranged to cooperate with the tensioning element associated with the punch member, cooperating work engaging surfaces on said tensioning elements to clamp a sheet to be operated upon by the working portions of said punch and die elements, and confining means for said tensioning elements directing flow thereof under applied pressure away from the working portions of the punch and die members when said tensioning elements are placed under pressure with the sheet material disposed between and clamped by said clamping surfaces.

3. A die set including cooperating punch and die members for operating upon sheet material disposed therebetween and sheet tensioning means for clamping the sheet material to be operated upon and for applying tension thereto prior to and during working of said sheet by said punch and die members comprising a tensioning element associated with the punch member and formed of a substantially incompressible material capable of flowing upon the application of pressure, a similar tensioning element associated with the die member, cooperating surfaces on said tensioning elements to clamp a sheet therebetween upon closing of said die set and prior to working of said sheet by said die members, and confining means for said tensioning elements directing flow thereof under applied pressure in a direction which will apply tension to said sheet.

4. A die set for shearing sheet material, such as fabrics and the like, including a punch member carrying a shearing element, a die member carrying a cutting block for cooperation with said shearing element, and tensioning means for clamping and tensioning the material to be sheared comprising a tensioning element associated with the punch member and formed of a substantially incompressible material capable of flowing under the application of pressure, a similar tensioning element associated with the die member, cooperating work engaging surfaces on said tensioning elements to clamp a sheet therebetween, the work engaging surface of the tensioning element associated with the punch member lying in a plane other than the plane of the cutting edge of the shearing element carried by the punch member whereby the sheet will be clamped between said work engaging surface prior to engagement of the cutting edge of the shearing element with the sheet, and confining means for the tensioning elements directing the flow thereof under applied pressure to tension the sheet which is clamped between the tensioning elements.

5. In a die set for operating on sheet material, a work tensioning arrangement comprising a pair of opposed tensioning elements formed of substantially incompressible material capable of flowing under the application of pressure, work engaging surfaces on said elements for engaging opposite surfaces of a work piece disposed therebetween when the die set is moved to a closed position, and confining means limiting flow of said tensioning elements to a direction which will apply tension to the work through the portion clamped between said work engaging surface as the die set is moved to its final closed position.

6. In a die set for operating upon sheet material, a work tensioning arrangement comprising a pair of opposed tensioning elements formed of substantially incompressible material capable of flowing under the application of pressure, work engaging surfaces on said elements cooperating to clamp a work piece therebetween in an area substantially surrounding the area to be worked by the dies, and confining means for said tensioning elements limiting flow of the same under compression and directing flow of the tensioning elements to apply tension to the work through the portion clamped between said work engaging surfaces.

7. In a die set including upper and lower die members, a work tensioning arrangement comprising a pair of tensioning elements associated with said dies, one with the upper member and one with the lower member, said tensioning elements being formed of a substantially incompressible material capable of flow under applied pressure, said elements substantially surrounding the working area of said dies, substantially flat work engaging surfaces on said elements cooperating to clamp the work therebetween, confining means limiting flow of said material, and means directing the flow of said material in an outward direction to tension the work substantially uniformly throughout the extent thereof within the boundaries of the work engaging surfaces.

8. In a die set including upper and lower die members, a work tensioning arrangement comprising a pair of tensioning elements associated with said dies, one with the upper member and one with the lower member, said tensioning elements being formed of a substantially incompressible material capable of flowing under applied pressure, substantially flat work engaging surfaces on said elements cooperating to clamp the work therebetween, and confining means limiting flow of said material, the upper element having an outwardly and downwardly chamfered surface extending to the work engaging surface and the lower element having an outwardly and upwardly chamfered surface extending to the work engaging surface, said chamfered surfaces aiding in directing flow of said incompressible material in a direction outwardly with respect to the working portions of said die set.

9. A die set for shearing circular pieces from sheet material including punch and die members having cooperative portions for shearing sheet material disposed therebetween and sheet tensioning means for clamping the sheet material to be operated upon and for applying tension thereto comprising a circular tensioning element associated with the punch member and formed of a substantially incompressible material capable of flowing under the application of pressure, a similar circular tensioning element associated with the die member and arranged to cooperate with the tensioning element associated with the punch member to clamp a sheet therebetween, and confining means for the tensioning elements preventing flow thereof inwardly toward the center of the die and also along the direction of applied pressure, each of said tensioning rings being free to flow radially outwardly from the center of the die to tension the sheet to be sheared throughout the extent thereof within the boundaries of the tensioning elements when pressure is applied to the tensioning elements.

10. A die set for shearing an annular piece from sheet material including punch and die members having cooperative portions for operating upon the sheet material disposed therebetween and for severing the same into an annulus and sheet tensioning means for clamping the sheet material to be operated upon and for applying tension thereto comprising an annular tensioning element surrounding the punch member and formed of a substantially incompressible material capable of flowing under the application of pressure, a similar circular tensioning element surrounding the die member, cooperating work engaging surfaces on said tensioning rings to clamp a sheet therebetween, confining means for the tensioning elements preventing flow of said elements inwardly toward the center of the dies and along the direction of applied pressure, said rings being free to flow radially outwardly from the center of the die under applied pressure to tension the sheet clamped at the work engaging surfaces, said rings being chamfered from a surface adjacent the punch and die elements toward the work engaging surfaces, to assist in directing the flow of said tensioning elements radially outwardly from the die set.

11. A die set including punch and die members having cooperative portions for forming sheet material and sheet tensioning and clamping means comprising complementary tensioning elements associated with the punch and die members, said tensioning elements being formed of substantially incompressible material capable of flowing under the application of pressure, said elements surrounding the punch and die members, and confining means for the tensioning elements limiting flow thereof to directions away from the working portions of the punch and die elements to tension the sheet clamped between the tensioning elements.

12. In a die set, a work tensioning arrangement comprising an upper tensioning element formed of a substantially incompressible material capable of flowing under the application of pressure substantially surrounding the die member, said tensioning element having a work engaging surface lying in a plane below the plane of the operating portion of the die element, means confining said tensioning element against flow inwardly toward the die and along the direction of applied pressure, a lower tensioning element similar to the upper tensioning element substantially surrounding a second die member adapted to cooperate with the first die member to work sheet material therebetween, said lower tensioning element having a work engaging surface lying in a plane above the plane of the operating portion of the die element which it surrounds and arranged to cooperate with the work engaging surface of the upper tensioning element to clamp a sheet disposed therebetween, means confining said lower tensioning element against flow inwardly toward the die and along the direction of applied pressure, said lower tensioning element being free to flow outwardly away from the die whereby when said die members are brought together with a sheet of material to be operated upon disposed therebetween, the sheet is first engaged by said work engaging surfaces of the tensioning elements and thereafter tension is applied to the sheet by flow of said tensioning elements away from the die in the zone of the work engaging surfaces of the tensioning elements.

13. In a die set, a work tensioning arrangement comprising means for clamping a sheet of material at a point outside of the working area of the dies, tensioning means for engaging opposite surfaces of said sheet at a point also outside the working area of the dies and opposed to said clamping point across said dies, said tensioning means comprising a pair of cooperating members formed of rubber-like material flowable under pressure and confined against flow except in a direction away from said clamping point, whereby compression of said tensioning elements in the closing of said dies results in the application of tension to said sheet between said points across said dies.

14. A die set in accordance with claim 1 in which the tensioning elements are formed of rubber-like material which is substantially incompressible but capable of flowing under dieing pressures.

HERMAN K. EGLI.